Oct. 4, 1932.    J. VAGLIO    1,880,603
CAGE FOR SAVING FATS
Filed Jan. 22, 1931
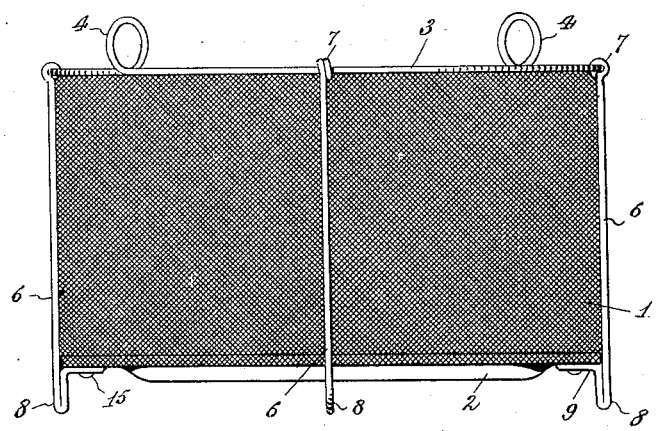
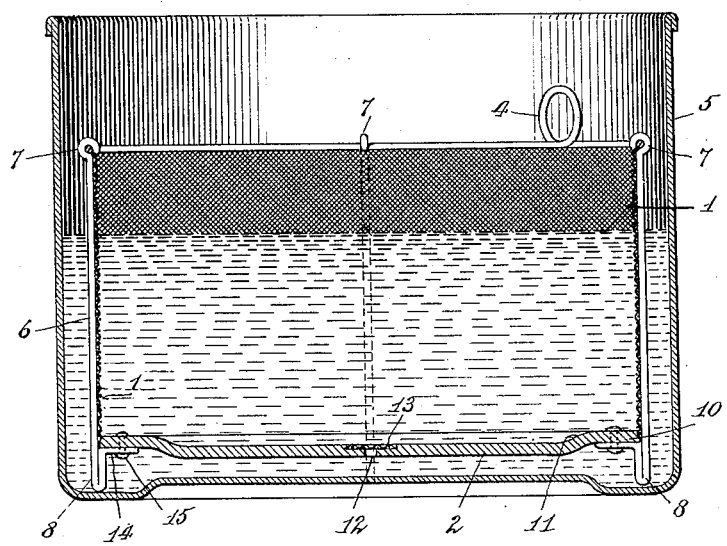
WITNESSES
INVENTOR
James Vaglio
BY
ATTORNEYS Patented Oct. 4, 1932

1,880,603

UNITED STATES PATENT OFFICE

JAMES VAGLIO, OF PASSAIC, NEW JERSEY

CAGE FOR SAVING FATS

Application filed January 22, 1931. Serial No. 510,572.

This invention relates to a cage for saving fats, the object being to provide a cage for the reception of dirt and particles of food dropped during the cooking operation.

Another object of the invention is to provide a cage for saving fats which coacts with a pot or other container and with a second cage or other means for carrying meat, potatoes, or other articles to be cooked, the arrangement being such that the first cage is fitted into the second cage during the cooking operation, while the first cage acts as means for catching dirt or other matter dropping from the articles being cooked.

An additional object, more specifically, is to provide a cage which will maintain cooking fats clean, the arrangement being such that a fine wire mesh form is presented having a solid bottom, and bracing members acting as legs for supporting the bottom above the pot or other container in which the cage is placed.

In the accompanying drawing—

Figure 1 is a side view of a cage disclosing the embodiment of the invention.

Figure 2 is a longitudinal vertical sectional view through a cage identical with that shown in Figure 1 and through a pot or container in which the cage is mounted.

Referring to the accompanying drawing by numeral, 1 indicates a foraminous and 2 a solid bottom. Preferably the foraminous body 1 is formed with fine wire mesh and is connected at its upper end to a rod 3 which at two points is formed loops 4 whereby the cage may be applied or removed from a suitable container as for instance pot 5. Any desired number of rods 6 are provided, said rods acting as supporting uprights with the upper ends thereof formed with eyes 7 encircling rod 3. The lower end of each rod is bent back on itself to form a leg 8 having a lateral extension 9 riveted or otherwise rigidly secured to the flange portion 10 of the bottom plate 2. The bottom plate 2 is offset downwardly at 11 whereby a recess or pocket is formed for catching dirt, articles of food or other matter. In this way, these articles or dirt are kept from the fat outside of the cage and also are removed from the fat in the cage when the cage is bodily lifted out of the pot. This is done from time to time in order to clean the bottom plate 2. By the provision of the depression or pocket for receiving dirt, burnt meat or other matter and by removing the cage from time to time, the fat in the pot 5 is kept clean, and consequently the food cooked therein will have a desired taste.

In restaurants and elsewhere, it is common to maintain a pot full of fat or several pots full of fat and to cook potatoes, meat or other articles therein. Heretofore, it has been customary to merely place the potatoes, meat or other articles in a wire mesh container and then place the container in the fat until the articles have been cooked. Any dirt, particles of food or other objectional matter is dropped into the bottom of the pot and forms a sediment which is stirred up more or less each time the cage is inserted or removed. In the present instance, the cage embodying the invention is left in the pot for an appreciable time and the usual cage or other article carrying the food is applied or removed after the articles of food are cooked. In this way the bottom plate 2 of the cage embodying the invention catches all the objectionable matter and when the cage is removed and cleaned this objectionable matter is also removed, thus leaving the fat clean and ready for use at all times.

As illustrated in Figure 2, an aperture 12 is provided centrally of the bottom and is adapted to be covered by wire mesh 13 whereby the fats may circulate but the dirt or other objectionable matter cannot pass through the aperture 12. In the drawing the bottom 2 is shown secured to the inturned flanges 14 by rivets 15 but it will be evident that bolts or other means could be used without departing from the present invention.

I claim:

1. A cage for saving fats comprising a side wall foraminous from the top edge to the bottom edge and a solid bottom connected to the bottom edge of said wall, said bottom having an annular portion offset toward the top edge of said wall and a supporting frame for said wall, said frame including an annular ring at the top and depending bars fitting against but positioned exteriorly of said wall, each of said bars having a laterally extending portion fitting beneath and in contact with the under surface of said offset portion and depending foot projecting beneath said laterally extending portion.

2. A cage for saving fats comprising a foraminous body from the top edge to the bottom edge formed of fine wire mesh, a bracing ring connected to said body at the top edge, a plurality of uprights exteriorly of said body connected with said ring and extending to a point below the bottom of said body, each of said uprights being bent back upon itself at the bottom for forming legs, each leg having a laterally extending flange, and a solid bottom having an annular portion at the periphery offset toward the top edge of said body rigidly secured to said flange.

3. A cage for saving fats including a foraminous body, a supporting and bracing ring arranged at the top of said body formed with diametrically opposite integral loops adapted to receive suspending members, a solid bottom connected to the bottom edge of said body and a plurality of vertical bracing bars, the upper end of the bars being coiled around said ring and the lower end being bent back upon itself and formed with a lateral flange projecting beneath said bottom and means for rigidly securing said flange to said bottom.

JAMES VAGLIO.